United States Patent
Luo et al.

(10) Patent No.: US 7,502,926 B2
(45) Date of Patent: Mar. 10, 2009

(54) 802.1X PROTOCOL-BASED MULTICASTING CONTROL METHOD

(75) Inventors: Hanjun Luo, Shenzhen (CN); Ruixin Lu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 526 days.

(21) Appl. No.: 10/723,385

(22) Filed: Nov. 25, 2003

(65) Prior Publication Data

US 2004/0172559 A1     Sep. 2, 2004

(30) Foreign Application Priority Data

Nov. 26, 2002   (CN)  ............... 02 1 54612

(51) Int. Cl.
*H04L 9/00* (2006.01)
*H04L 7/00* (2006.01)
*H04H 20/71* (2008.01)
*H04R 25/00* (2006.01)

(52) U.S. Cl. ............ 713/163; 370/270; 455/3.01; 381/311

(58) Field of Classification Search ......... 713/163; 370/270; 455/3.01; 381/311
See application file for complete search history.

(56) References Cited

U.S. PATENT DOCUMENTS

| | | | | |
|---|---|---|---|---|
| 5,548,646 | A * | 8/1996 | Aziz et al. | 713/153 |
| 6,188,691 | B1 * | 2/2001 | Barkai et al. | 370/390 |
| 6,216,167 | B1 * | 4/2001 | Momirov | 709/238 |
| 6,324,575 | B1 * | 11/2001 | Jain et al. | 709/221 |
| 6,577,642 | B1 * | 6/2003 | Fijolek et al. | 370/465 |
| 6,614,787 | B1 * | 9/2003 | Jain et al. | 370/390 |
| 6,973,309 | B1 * | 12/2005 | Rygula et al. | 455/436 |
| 6,996,714 | B1 * | 2/2006 | Halasz et al. | 713/163 |

(Continued)

FOREIGN PATENT DOCUMENTS

EP    0 967 753 A2    12/1999

(Continued)

OTHER PUBLICATIONS

An Architecture for User Authentication of IP Multicast and Its Implementation Norihiro Ishikawa I, Nagatsugu Yamanouchi and Osamu Takahashi' NTT Information and Communication Systems Laboratories IBM Research, Tokyo Research Laboratory.*

(Continued)

*Primary Examiner*—Matthew B Smithers
*Assistant Examiner*—Techane J Gergiso
(74) *Attorney, Agent, or Firm*—Wolf, Greenfield & Sacks, P.C.

(57) ABSTRACT

The present invention discloses an 802.1X protocol-based multicasting control method. According to the method, an authenticated subscriber intercepts the message while sending a request message for joining in a multicasting group, then obtains the port and MAC address information from the intercepted message, searches corresponding subscriber account information from the authenticated data according to said port and MAC address, then authenticates the subscriber's account number and multicasting IP address, and adds the subscriber to the multicasting group after successful authentication; therefore, controlled multicasting, authentication of the legality of adding to multicasting, and accounting can be achieved according to the method, which can also protect existing investment and compatibility with existing software of the subscriber.

4 Claims, 3 Drawing Sheets

U.S. PATENT DOCUMENTS

| | | | |
|---|---|---|---|
| 7,031,288 B2 * | 4/2006 | Ogier | 370/338 |
| 7,082,200 B2 * | 7/2006 | Aboba et al. | 380/273 |
| RE39,360 E * | 10/2006 | Aziz et al. | 713/150 |
| 7,116,661 B2 * | 10/2006 | Patton | 370/390 |
| 7,181,530 B1 * | 2/2007 | Halasz et al. | 709/238 |
| 2002/0032780 A1 * | 3/2002 | Moore et al. | 709/228 |
| 2002/0062388 A1 * | 5/2002 | Ogier et al. | 709/238 |
| 2003/0058827 A1 * | 3/2003 | Chow et al. | 370/338 |
| 2003/0120817 A1 * | 6/2003 | Ott et al. | 709/249 |
| 2004/0019786 A1 * | 1/2004 | Zorn et al. | 713/168 |
| 2004/0095954 A1 * | 5/2004 | Varney et al. | 370/444 |
| 2006/0126651 A1 * | 6/2006 | Yu | 370/404 |

FOREIGN PATENT DOCUMENTS

| | | |
|---|---|---|
| WO | WO 02/45334 A1 | 6/2002 |

OTHER PUBLICATIONS

IEEE Std 802.1X-2001 Port-Based Network Access Control Approved Jun. 14, 2001 IEEE-SA Standards Board.*

European Search Report from corresponding European Application No. 03103921.

IEEE-SA Standards Board: *IEEE Standard for Local and Metropolitan Area Networks-Port-Based Network Access Control*, Online, Jun. 14, 2001, The Institute of Electrical and Electronics engineers, Inc. New York XP002270244.

Ishikawa N, et al., *An Architecture for User Authentication of IP Multicast and its Implementation*, Internet Workshop, 1999. IWS 99 Osaka, Japan Feb. 18-20, 1999, Piscataway, NJ, IEEE US, Feb. 18, 1999, pp. 81-87, XP010365582.

* cited by examiner

802.1X PROTOCOL-BASED MULTICASTING CONTROL METHOD

FIELD OF THE INVENTION

The present invention relates to a multicasting control method in communication networks, in particular to an 802.1X protocol-based multicasting control method.

BACKGROUND OF THE INVENTION

In communications networks, for data forwarding device such as switch or router, it is advantageous for data security and utilization of network resources to forward network data by subscriber groups. For instance, suppose there is a multicasting group G in a communication network, a query message is sent a certain time period after the router forwards the data for said multicasting group G to verify whether any member of said multicasting group G still exists, and members in said multicasting group G sends Internet Group Management Protocol (IGMP) messages again to respond to said query message; in case that no member of said multicasting group exists in the network, the router receives no response, then the router tries to query again, and if the router still receives no message, it deems no member of said multicasting group G exists in the network and then stop forwarding data for said multicasting group G. Due to the fact that data forwarding with said multicasting group management method is more specific when compared to broadcasting mode, data security and forwarding efficiency are higher.

However, traditional LANs using IEEE 802.1x protocol can only implement port-based multicasting control, i.e., add subscribers to multicasting groups through adding ports to those multicasting groups. When a request for joining in a multicasting group is sent from a subscriber's terminal, the network switching device, according to the circumstance, adds the MAC address of said terminal to said multicasting group so as to add the subscriber to said multicasting group. Such a method only provides port number and MAC address of the subscriber's terminal rather than subscriber information, therefore any control related with said subscriber can't be performed due to lack of subscriber information. Though IEEE 802.1X protocol is a port-based network access control protocol, which supports subscriber management and accepts multi-subscriber authentication through a single port, such capability can't be utilized to control addition of subscribers to a multicasting group, resulting in uncontrollability of addition of subscribers to a multicasting group.

SUMMARY OF THE INVENTION

It is the object of the present invention to provide an 802.1X protocol-based multicasting control method to implement controllability of addition of subscriber to multicasting group.

To attain the above object, an 802.1X protocol-based multicasting control method, comprising the following steps:

Step 1: intercepting the request message for joining in a multicasting group sent by an authenticated subscriber;

Step 2: obtaining the port and MAC address of the subscriber from the intercepted message;

Step 3: searching corresponding subscriber account information from the authenticated data according to said port and MAC address;

Step 4: authenticating the subscriber's account number and multicasting IP address, and then adding the subscriber to the multicasting group if the authentication is passed successfully; otherwise the subscriber's request is rejected.

Said method further comprises: the authentication server at 802.1X authentication end is utilized to authenticate the subscriber's account number and multicasting IP address.

The authentications of subscriber's account number and multicasting IP address are implemented through verifying whether the multicasting IP address is authorized to accept the subscriber with said account number.

If said 802.1X is based on port authentication, when a subscriber attached to said port makes a request for joining in a multicasting group, the subscriber's MAC address is searched for first; if said MAC address is found, the subscriber's account number is searched for according to said MAC address and port number;

if said 802.1X protocol is based on MAC authentication, when a subscriber attached to said port makes a request for joining in a multicasting group, the subscriber's account number is searched for directly according to the subscriber's MAC address and port number.

The subscriber joins in the multicasting group through IGMP protocol.

According to the method of the present invention, when a subscriber authenticated through 802.1X protocol requests to join in a multicasting group, the request message for joining in the multicasting group is intercepted first, and then the subscriber's port and MAC address information is obtained from said intercepted message instead of adding the subscriber directly to the multicasting group, then corresponding subscriber information is searched for from authenticated data according to said port and MAC address information, and the subscriber's account number and multicasting IP address are authenticated again, and then the subscriber is added to the multicasting group if the authentication is passed successfully, otherwise the subscriber's request is rejected. Said solution can implement controlled multicasting, authentication of the legality of adding to multicasting, and accounting; in addition, said method doesn't require modification to multicasting client software or server software, instead, only simple configuration at 802.1X device end and authentication server at authentication end is necessary, it is advantageous for protection of existing investment and compatibility to existing software.

DETAILED DESCRIPTION OF THE EMBODIMENT

The present invention is described in further detail hereunder with reference to the drawings.

Figure 1:
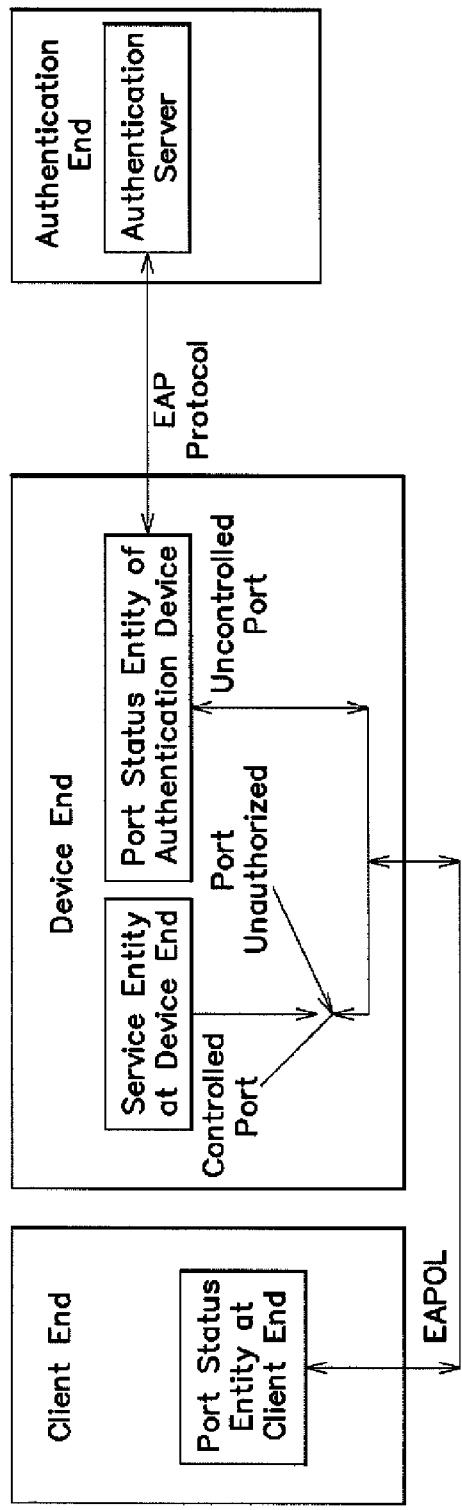
FIG. 1 shows the architecture of 802.1X protocol.

Referring to FIG. 1, wherein the IEEE 802.1X protocol shown in FIG. 1 is a port-based network access control protocol and is used to authenticate and control client access at physical layer of network devices. There are three entities in FIG. 1: 802.1X client end, 802.1X device end, and authentication end. Authentication information is exchanged through extensible authentication protocol (EAP) between authentication servers of authentication end and 802.1X device end.

EAPOL serves as the authentication protocol between 802.1X client end and 802.1X device end. Usually, 802.1X device end is implemented at access layer of network; 802.1X client end is installed in subscriber's PC; 802.1X authentication server system usually resides in the operator's AAA (Accounting, Authentication, and Authorization) center. There are controlled ports and uncontrolled ports inside of 802.1X device end. The uncontrolled ports are always in two-way connected state and are mainly used to transfer EAPOL frames; therefore, EAPOL frames can be received and sent via the uncontrolled ports at any time. The controlled ports are opened only when the authentication is passed so as to transfer network resources and services. According to the application environment, the controlled ports may be configured as two-way controlled or one-way controlled. With above architecture, if the 802.1X device end is implemented with an Ethernet switch or broadband access device, any subscriber device of client end connected to ports on the Ethernet switch or broadband access device can access internal network resources if it passed the authentication; otherwise it can't access internal network resources. Above ports may be physical ones or logical ones, for instance, a typical application is to connect a client PC to a physical port of the Ethernet switch.

Currently, Radius protocol can also run between 802.1X device end and authentication server in the architecture shown in FIG. 1; so the authentication server is a Radius server, and the 802.1X device end may be deemed as a client connected to the Radius server.

Seen from above, in the architecture shown in FIG. 1, 802.1X protocol will be triggered to authenticate the subscriber when the Ethernet switch transfers the EAPOL-Start message sent from an 802.1X client end to the 802.1X device end. After the authentication server at authentication end successfully authenticate the subscriber, controlled ports of 802.1X device end are opened to transfer network resources and services for the subscriber. Hence the subscriber is online. If the host of a subscriber online wants to add to a multicasting group, said host sends an IGMP message (suppose IGMP protocol is used, in fact, it is not limited to the protocol) to the Ethernet switch (device end) through multicasting client software to indicate to join in said multicasting group, thus the Ethernet switch begins to forward the data of said multicasting group to said subscriber's host.

As the result, network connection to the subscriber will be established through 802.1X protocol as long as the subscriber passes 802.1X protocol-based authentication. On that basis, if the subscriber requests to join in a multicasting group, the MAC address and port number of the subscriber's host may be obtained from the subscriber's message or request transferred through the connection. In this way, detailed information of the subscriber can be obtained from the subscriber's authentication data according to said MAC address and port number so as to implement control of multicasting addition and to solve uncontrollability issue of multicasting addition according to traditional methods.

Figure 2:
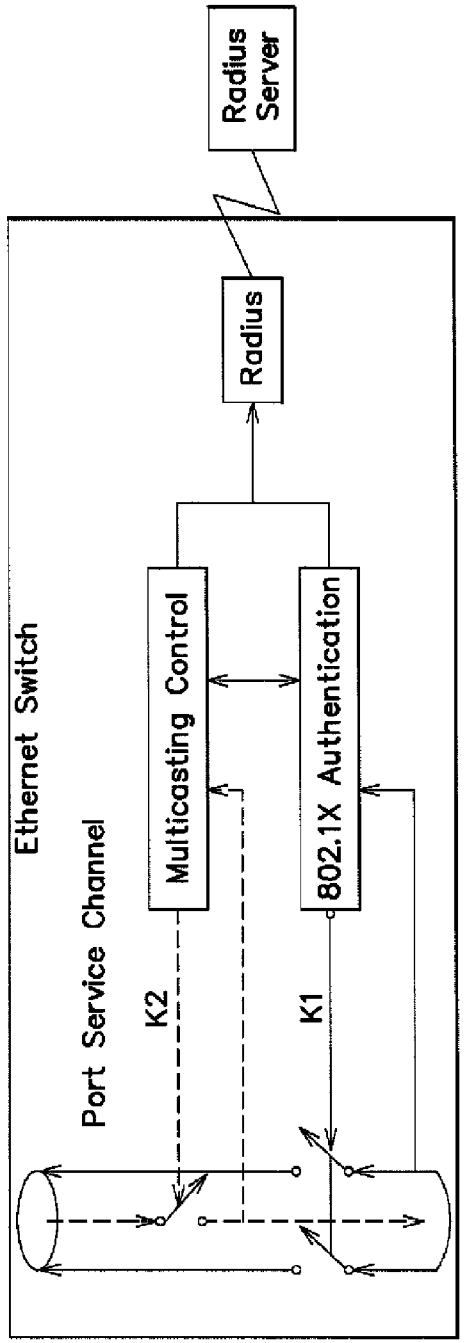
FIG. 2 shows the architecture of 802.1X authentication-based controlled multicasting.

The basic principle of the present invention is shown in FIG. 2. The Ethernet switch shown in FIG. 2 is designed to connect the client end shown in FIG. 1 and implement the device end shown in FIG. 1. Therefore, said Ethernet switch is used to control switch on/off of network connection to the client. Because that the ports on the Ethernet switch are unavailable for unauthenticated subscribers but can be configured automatically and dynamically and can be used to access network resources for authenticated subscribers, the 802.1X protocol-based Ethernet switch shown in FIG. 2 brings operation features to operators. The Ethernet switch as 802.1X device end in FIG. 2 employs a Radius protocol module to transfer authentication information to the Radius server as authentication end. The 802.1X authentication module is used to receive 802.1X protocol-based authentication information sent by the subscriber from the corresponding port on the Ethernet switch and transfers said authentication information (containing detailed information of the subscriber, such as user name and password, etc.) to the authentication server at the authentication end for authentication through the Radius authentication module. If the subscriber passes the authentication, the authenticated information contains detailed information of the subscriber, and the 802.1X authentication module will launch a port service channel (equivalent to connecting to the switch K1 in FIG. 2) for the subscriber. In this way, the subscriber may access network resources through that port service channel, i.e., an 802.1X protocol-based network connection is established for the subscriber. On the basis of above 802.1X connection, if the subscriber sends a request message (suppose it is an IGMP-based message) to join in a multicasting group through said port service channel, the multicasting control module in the Ethernet switch can be configured to intercept said IGMP message so as to obtain the subscriber's MAC address and port number in the IGMP message, and then obtains the subscriber's account number information (user name, password, etc.) through the 802.1X connection for the subscriber according to said MAC address and port number, next, a controlled multicasting connection is established according to the subscriber's information and the multicasting IP address, i.e., the multicasting control module controls the switch on/off of the multicasting switch K2 as required. Therefore the combination of multicasting and 802.1X authenticated port and subscriber's MAC address delivers controllability of multicasting addition. As for the case in FIG. 2, the 802.1X authentication module controls switch K1 of the port service channel, and the multicasting control module controls the multicasting switch K2 of the port service channel.

Figure 3:
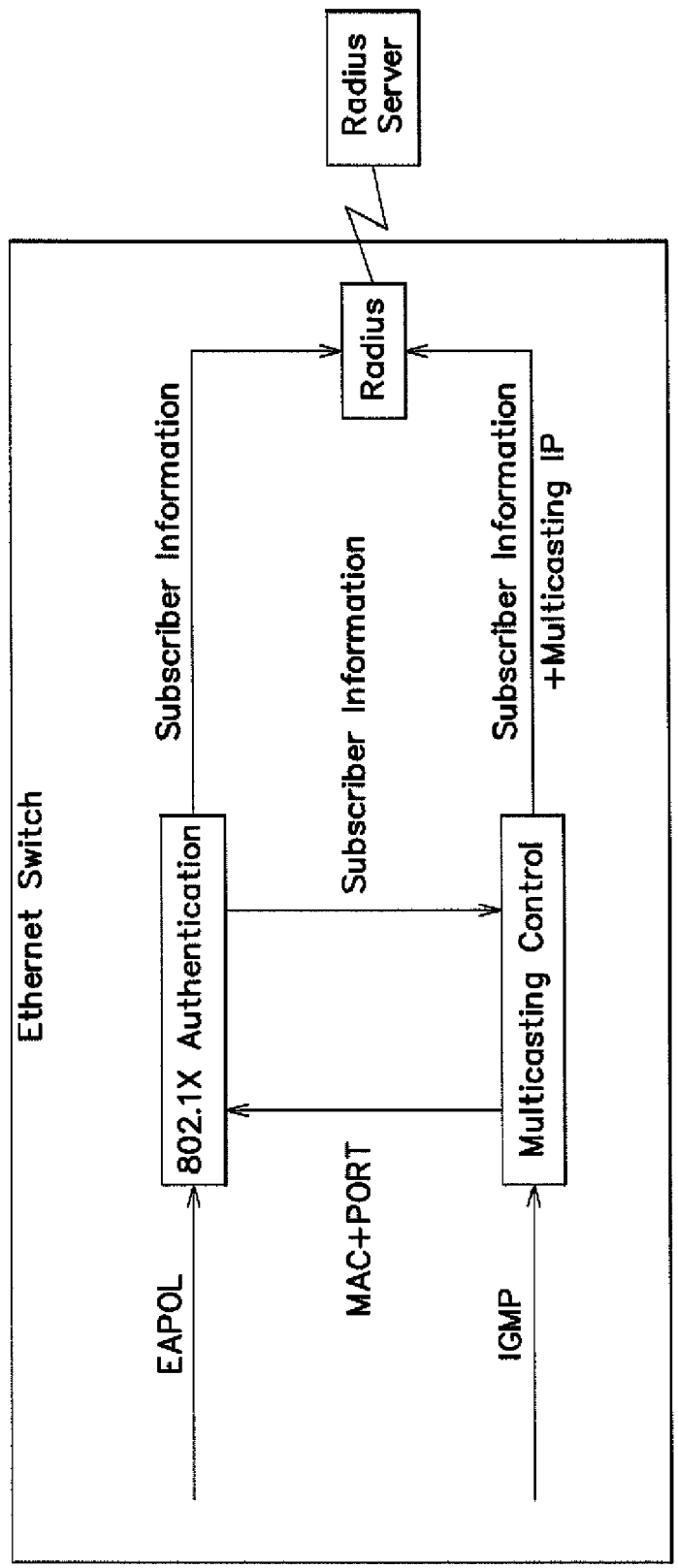
FIG. 3 shows the authentication process of 802.1X authentication-based controlled multicasting.
Figure 4:
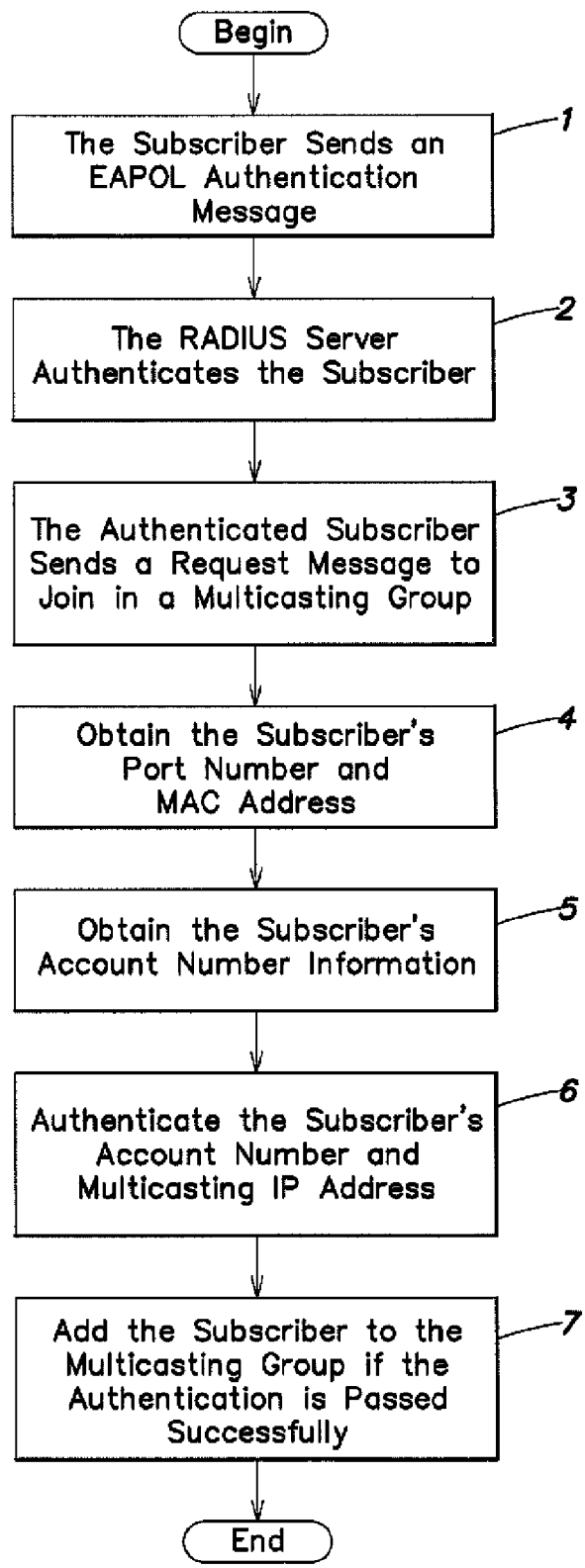
FIG. 4 is the flow chart of an embodiment of the method according to the present invention.

FIG. 4 is the flow chart of an embodiment of the method according to the present invention. Please refer to FIG. 3 for the 802.1X authentication-based controlled multicasting authentication process described in FIG. 4. It is noted that the embodiment shown in FIG. 4 supposes IGMP protocol is used to add the subscriber to the multicasting group and the multicasting control module in the Ethernet switch is preconfigured to intercept the IGMP message sent by the subscriber. As shown in FIG. 4, in step 1, the subscriber sends an EAPOL message to trigger 802.1X protocol authentication at 802.1X device end at the beginning of online, i.e., the EAPOL message is transferred to the 802.1X authentication module in the Ethernet switch (device end); in step 2, the 802.1X authentication module sends the subscriber's authentication information to the Radius server at authentication end for authentication via the Radius module. When the authentication is passed successfully, the authenticated subscriber information is stored in the Ethernet switch (e.g. in the 802.1X authentication module). Said two steps are mainly designed to accomplish subscriber authentication process and bring the subscriber online. If the authenticated subscriber sends an IGMP message in step 3 to request to join in a multicasting group, the multicasting control module intercepts the IGMP message in step 4; here, the multicasting control module will not add that subscriber to the multicasting group directly, instead, it sends the subscriber's port number and MAC address information obtained from the IGMP message to the 802.1X authentication module, which searches for corresponding subscriber account number information in the authenticated data according to port and MAC address information, and then feeds back said subscriber account information to the multicasting control module; in step 6, the multicasting control module sends the subscriber's account number and multicasting IP address to the Radius server at authentication end for authentication via the Radius module again, i.e., the Radius server authenticates the subscriber according to the subscriber's account number and multicasting IP address through verifying whether said multicasting IP address is authorized to accept the subscriber of said account number; if the authentication is passed successfully, the subscriber is added to said multicasting group in step 7; otherwise the subscriber's request is rejected. After the subscriber is added to said multicasting group, the multicasting control module maintains said multicasting connection till the subscriber request exits.

It should be noted that because the 802.1X protocol-based authentication on existing Ethernet switches may be port-based or MAC address-based, the two cases should be treated differently. In port-based authentication mode, the 802.1X module for each port only controls a single authenticated subscriber and hence only maintains one 802.1X connection; however, when the 802.1authentication is passed, said port can be attached with several client PCs. As a result, when any of the client PCs attached to that port requests to join in a multicasting group, the MAC substitution method is used, i.e., the Ethernet switch will instruct the 802.1X module to verify whether the subscriber's MAC address exists; if yes, it indicates the subscriber has passed the authentication, the 802.1X module will return the authenticated subscriber's MAC address to the Ethernet switch. The multicasting control module then searches for the subscriber's account number according to the returned MAC address and port number.

In MAC address-based authentication mode, the 802.1X module has authenticated each PCs attached to the port and corresponding connections are available. Therefore, when a subscriber attached to said port requests to join in a multicasting group, the Ethernet switch will query the subscriber's MAC address directly in the 802.1X module; when the 802.1X module returns the MAC address, the Ethernet switch will search for the subscriber's account number according to the MAC address and port number. Therefore, each subscriber can find corresponding 802.1X connection according to respective MAC address and port number, i.e., the subscriber's account information can be obtained.

The embodiment shown in FIG. 4 employs a Radius server to manage the subscribers' information. Therefore, the embodiment also employs the Radius server to control the addition of subscriber multicasting. In detail, it is implemented through adding a controlled multicasting property item in the Radius server, i.e., the subscriber's account number is configured on the Radius server, and then the value-added multicasting service is added to said account number. With that property item, one or more multicasting addresses can be added for the subscriber. When the Radius server receives an authentication request containing the subscriber's account number and multicasting IP address, if the controlled multicasting property is available, the Radius server will verify whether the multicasting IP address is authorized; if it is authorized, the Radius server returns an "authentication passed" message, otherwise the Radius server returns an "authentication failed" message.

As a result, the multicasting service property item can be attached to the subscriber's account as a value-added service property, i.e., the subscriber is added first, and then a multicasting channel is launched for said subscriber. In this way, the value-added multicasting service may be implemented for operators according to the present invention to separate value-added multicasting service accounting from elementary 802.1X access authentication connection accounting, in order to facilitate settlement between different service providers.

The invention claimed is:

1. An 802.1X protocol-based multicasting control method, comprising the following steps:
   Step 1: performing 802.1X authentication for a subscriber and storing authenticated subscriber information;
   Step 2: intercepting a request message for joining in a multicasting group sent from the subscriber;
   Step 3: obtaining a port number, a MAC address and a multicasting IP address of the subscriber from the request message;
   Step 4: searching corresponding subscriber account information in the 802.1X authenticated subscriber information according to said port number and MAC address;
   Step 5: authenticating the subscriber's account number information and the multicasting IP address, and then adding the subscriber to the multicasting group if the authentication is passed successfully; otherwise rejecting the subscriber's request;
   wherein if said 802.1X authentication is based on port, when a subscriber attached to said port makes a request for joining in a multicasting group, the subscriber's MAC address is searched for first; if said MAC address is found, the subscriber's account number information is searched for according to said MAC address and said port number;
   if said 802.1X authentication is based on MAC, when a subscriber attached to said port makes a request for joining in a multicasting group, the subscriber's account number information is searched for directly according to the subscriber's MAC address and the port number; and
   wherein the subscriber joins in the multicasting group through IGMP protocol.

2. The 802.1X protocol-based multicasting control method according to claim 1, wherein in step 5, an authentication server at 802.1X authentication end is used to authenticate the subscriber's account number information and the multicasting IP address.

3. The 802.1X protocol-based multicasting control method according to claim 1, wherein in step 5, the authentications of the subscriber's account number and the multicasting IP address are implemented through verifying whether the multicasting IP address is authorized to receive said account number information.

4. An 802.1X protocol-based device, comprising: a Radius module, a 802.1X authentication module and a multicasting control module, wherein, the 802.1x device is implemented with an Ethernet switch or broadband access device;
   the 802.1X authentication module receives 802.1X protocol-based authentication information sent by a subscriber from a corresponding port on the 802.1X protocol-based device and transfer said authentication information to a Radius server for authentication through the Radius module;
   the multicasting control module intercepts a request message for joining in a multicasting group sent from the subscriber to obtain the subscriber's MAC address and port number in the message for joining in a multicasting group and send the subscriber's port number and MAC address information obtained from the message for joining in a multicasting group to the 802.1X authentication module;
   the 802.1X authentication module searches for corresponding subscriber account number information according to the port and MAC address information, and then feeds back the subscriber account number information to the multicasting control module;

the multicasting control module sends the subscriber's account number and multicasting IP address to the Radius server for authentication via the Radius module;

the multicasting control module maintains the multicasting connection till the subscriber request exits after the subscriber is added to said multicasting group;

wherein if the 802.1X authentication is based on port, when a subscriber attached to said port makes a request for joining in a multicasting group, the subscriber's MAC address is searched for first; if said MAC address is found, the subscriber's account number information is searched for according to said MAC address and said port number;

if the 802.1X authentication is based on MAC, when a subscriber attached to said port makes a request for joining in a multicasting group, the subscriber's account number information is searched for directly according to the subscriber's MAC address and the port number.

* * * * *